US012736646B2

(12) United States Patent
Simonton et al.

(10) Patent No.: US 12,736,646 B2
(45) Date of Patent: Sep. 15, 2026

(54) SONAR SYSTEM WITH REMOVABLE LENS

(71) Applicant: Garmin International, Inc., Olathe, KS (US)

(72) Inventors: Troy D. Simonton, Olathe, KS (US); Ashlyn M. Haack, Olathe, KS (US); Yuling Wen, Olathe, KS (US); Aaron R. Coleman, Tulsa, OK (US); Brian T. Maguire, Tulsa, OK (US)

(73) Assignee: Garmin International, Inc., Olathe, KS (US)

( * ) Notice: Subject to any disclaimer, the term of this patent is extended or adjusted under 35 U.S.C. 154(b) by 116 days.

(21) Appl. No.: 18/732,245

(22) Filed: Jun. 3, 2024

(65) Prior Publication Data

US 2025/0370113 A1 Dec. 4, 2025

(51) Int. Cl.
*G01S 7/521* (2006.01)
*G01S 7/62* (2006.01)

(52) U.S. Cl.
CPC ................ *G01S 7/521* (2013.01); *G01S 7/62* (2013.01)

(58) Field of Classification Search
CPC .................................. G01S 7/521; G01S 7/62
See application file for complete search history.

(56) References Cited

U.S. PATENT DOCUMENTS 2,863,075 A * 12/1958 Fry ....................... G10K 11/30 367/150
4,084,150 A * 4/1978 Massa .................... G01S 15/18 367/155
RE32,062 E * 1/1986 Samodovitz ........... G10K 11/30 367/150
4,751,686 A * 6/1988 Uchino ............... G01S 15/8906 73/609
5,186,428 A * 2/1993 Falkenberg .......... G10K 11/006 367/173
7,961,552 B2 6/2011 Boucher et al.
9,664,783 B2 5/2017 Brown et al.
10,310,062 B2 6/2019 Coleman et al.
10,656,298 B2 * 5/2020 Leonard ................. G01N 29/00
11,287,544 B2 * 3/2022 Leonard ................. G10K 11/22
2008/0194967 A1 * 8/2008 Sliwa ...................... A61N 7/02 600/472
2008/0195003 A1 * 8/2008 Sliwa ...................... A61N 7/02 601/3
2016/0277052 A1 * 9/2016 Sadek ............ H04M 1/724092

(Continued)

FOREIGN PATENT DOCUMENTS

CN 102975833 A * 3/2013
CN 205301676 U * 6/2016

(Continued)

*Primary Examiner* — Daniel Pihulic
(74) *Attorney, Agent, or Firm* — Samuel M. Korte; Max M. Ali; Kathleen D. Fitterling

(57) ABSTRACT

A transducer system comprises a removable sonar lens, a transducer unit, and a cable extending from the transducer unit to couple the transducer unit to an electronic display unit. The transducer unit may include a main transducer housing, a sonar transducer positioned within the main transducer housing, and an attachment mechanism to enable the sonar lens to removably attach to the main transducer housing adjacent to the sonar transducer. The removable sonar lens can modify the sonar signals generated by the sonar transducer.

7 Claims, 8 Drawing Sheets

(56) References Cited

U.S. PATENT DOCUMENTS

| | | | | |
|---|---|---|---|---|
| 2018/0011211 | A1* | 1/2018 | Leonard | G01N 29/221 |
| 2018/0100922 | A1* | 4/2018 | Wigh | G01S 15/87 |
| 2019/0020816 | A1* | 1/2019 | Shan | G06V 20/40 |
| 2020/0271812 | A1* | 8/2020 | Leonard | G01N 29/2462 |
| 2021/0270963 | A1* | 9/2021 | Caspall | G01S 15/42 |
| 2021/0364636 | A1* | 11/2021 | Simonton | G01S 7/521 |
| 2023/0384446 | A1 | 11/2023 | Simonton | |
| 2025/0325839 | A1* | 10/2025 | Lay | A61N 7/00 |

FOREIGN PATENT DOCUMENTS

| | | | | | |
|---|---|---|---|---|---|
| CN | 206640708 | U | * | 11/2017 | |
| JP | H0634009 | B2 | * | 5/1994 | G01B 17/00 |
| JP | H0635964 | B2 | * | 5/1994 | |
| JP | 3551520 | B2 | * | 8/2004 | G02B 15/1425 |
| JP | 3217135 | U | * | 7/2018 | |
| RU | 2786503 | C1 | * | 12/2022 | |
| WO | 2021010949 | A1 | | 1/2021 | |

* cited by examiner

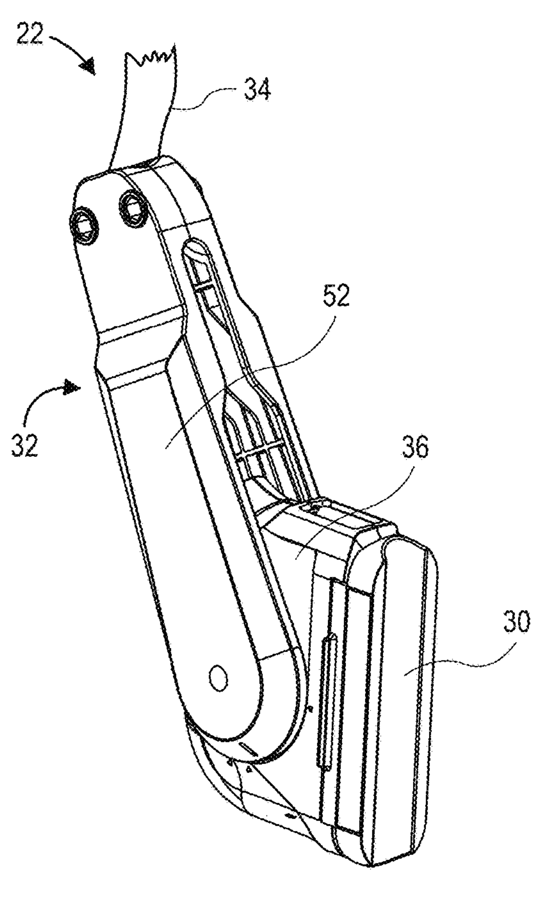
FIG. 2
22
32
52
36
30
FIG. 3
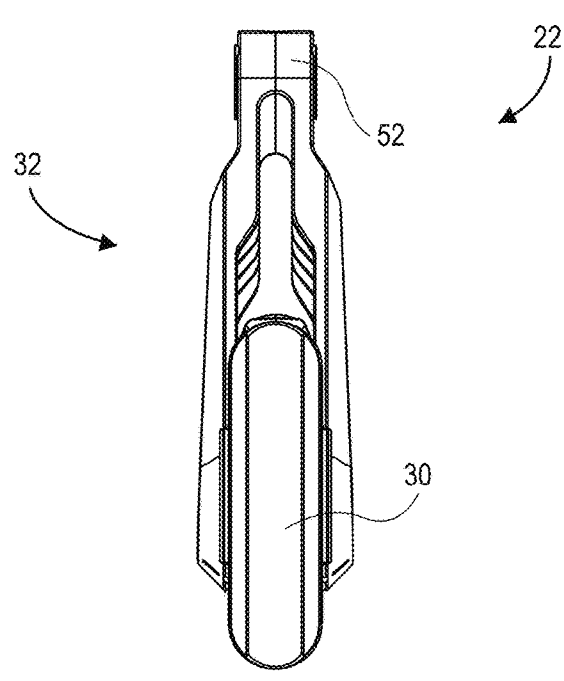
FIG. 4

SONAR SYSTEM WITH REMOVABLE LENS

BACKGROUND

A user's ice fishing experience is often improved by using sonar to help ensure that the user has selected an appropriate hole through which to fish. Sonar systems typically use cumbersome or complex equipment for setup and cannot be readily adapted on the ice for different fishing scenarios.

BRIEF DESCRIPTION OF THE DRAWINGS

Embodiments of the present invention are described in detail below with reference to the attached drawing figures, wherein:

FIG. 2 is a perspective view of an example transducer unit forming part of the sonar display system;

FIG. 3 is a side view of the transducer unit of FIG. 2;

FIG. 4 is a front view of the transducer unit of FIGS. 2-3;

Figure 1:
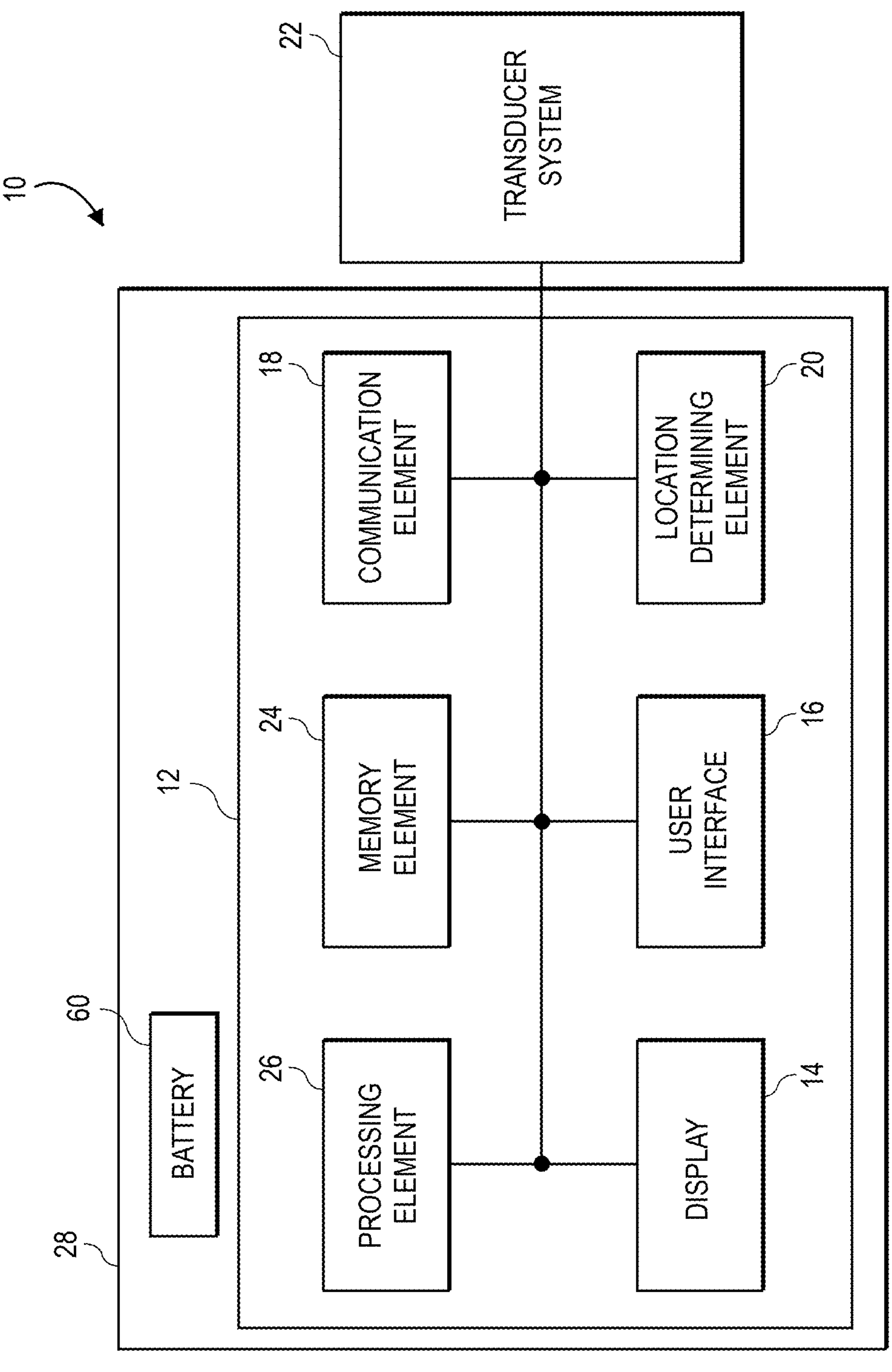
FIG. 1 is a block diagram of an example marine sonar display system according to embodiments of the present invention.
Figure 5:
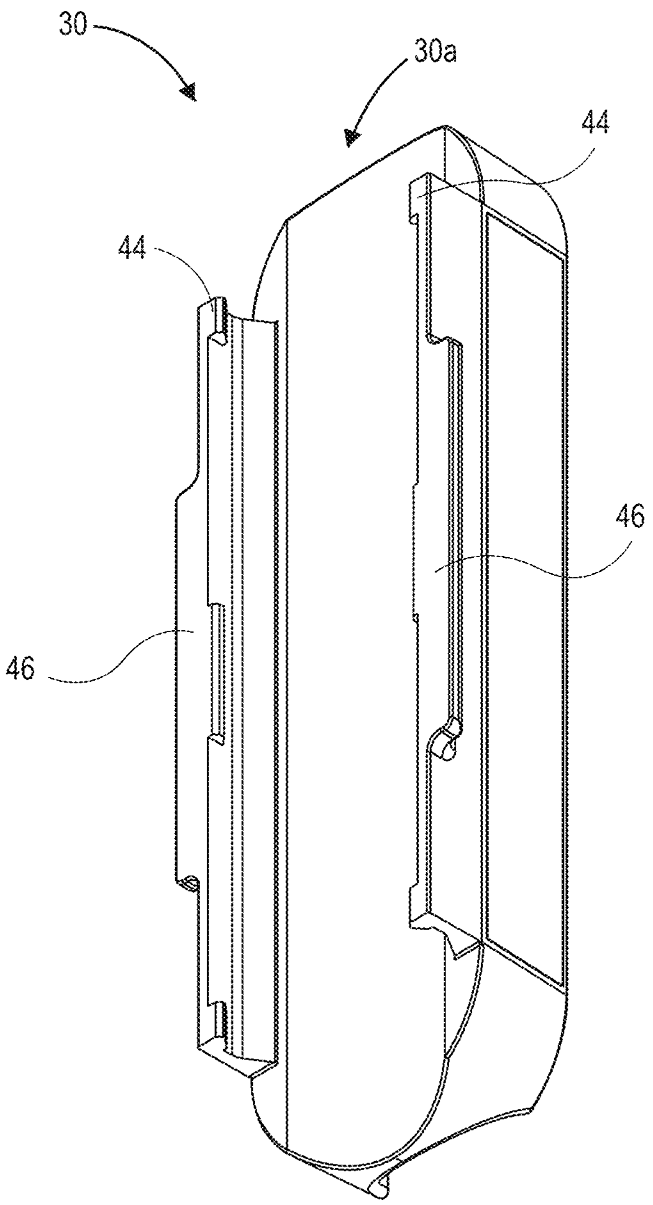
FIG. 5 is a rear perspective view of an example sonar lens used with the transducer unit of FIGS. 2-4.
Figure 6:
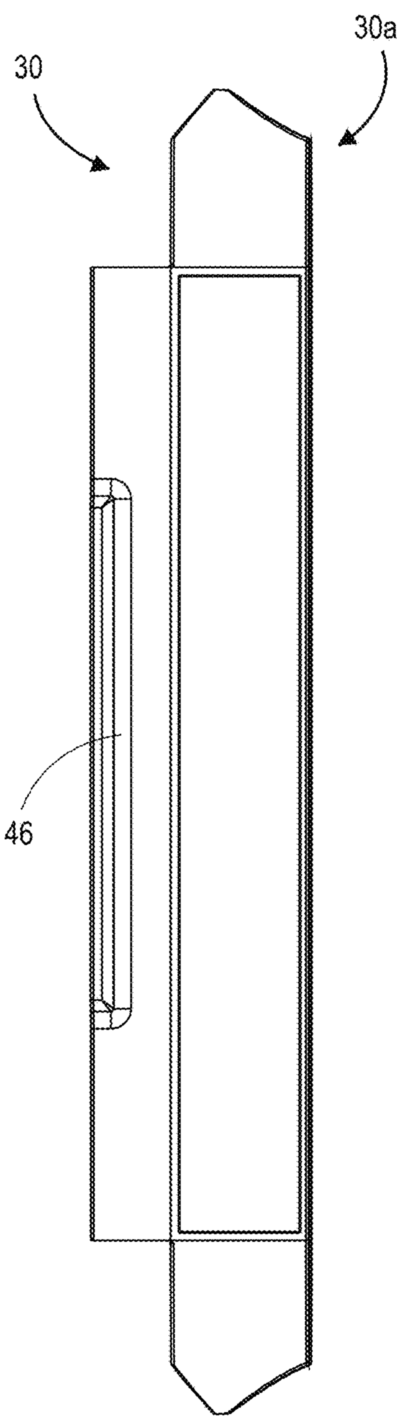
FIG. 6 is a side view of the sonar lens of FIG. 5.
Figure 7:
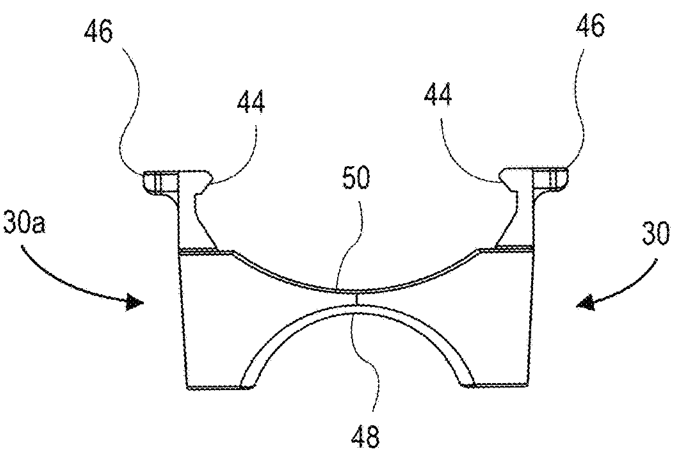
FIG. 7 is a top view of the sonar lens of FIGS. 5-6.
Figure 8:
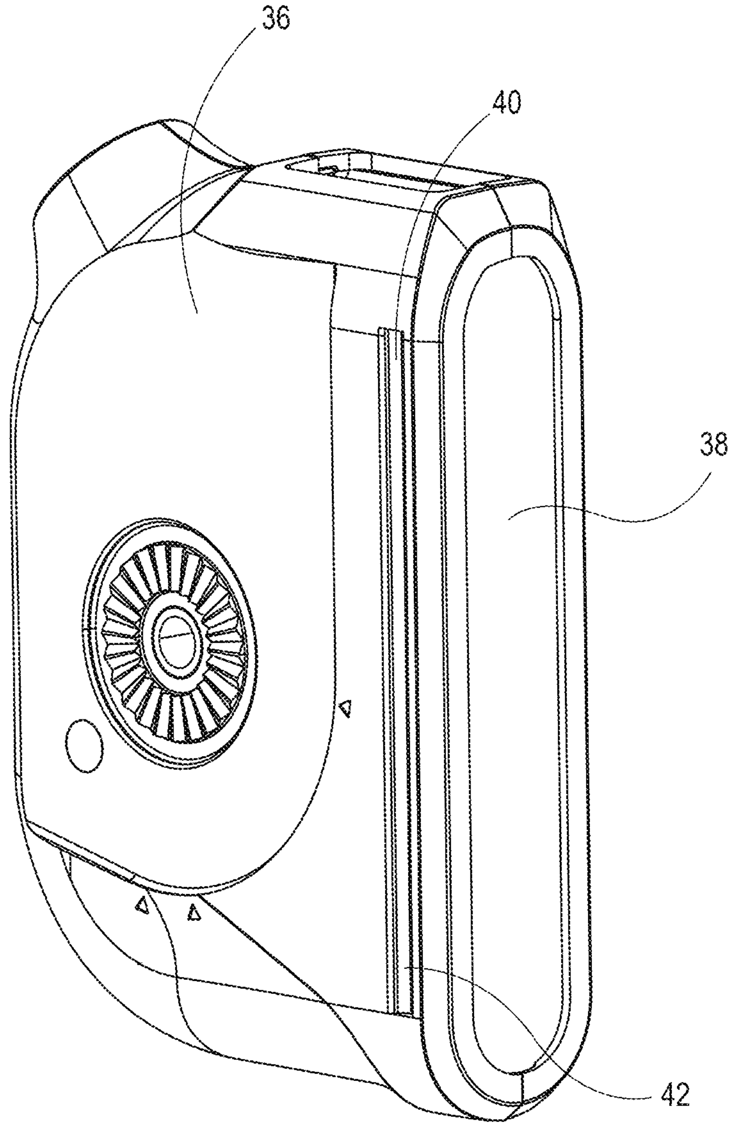
FIG. 8 is a perspective view of an example transducer housing of the transducer unit of FIGS. 2-4.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Embodiments of the technology will now be described in more detail with reference to the drawing figures. Referring initially to FIG. 1, a marine sonar display system 10 is illustrated which is configured to display images of underwater objects derived from multibeam sonar. The marine sonar display system 10 broadly comprises a housing 12, a display 14, a user interface 16, a communication element 18, a location determining element 20, a transducer system 22, a memory element 24, a processing element 26, and a portable system bag 28. As described below, the transducer system 22 is configured for use in ice fishing and other scenarios where it may be easily suspended in the water column.

The housing 12, as shown in FIG. 1, generally encloses and protects various components from moisture, vibration, and impact. In embodiments where the display system 10 is a chartpotter, the housing 12 may retain display 14, user interface 16, communications element 18, location determining element 20, and memory and processing elements 24, 26. The housing 12 may be constructed from a suitable lightweight and impact-resistant material such as, for example, plastic, nylon, aluminum, or any combination thereof. The housing 12 may include one or more appropriate gaskets or seals to make it substantially waterproof or resistant. The housing 12 may take any suitable shape or size, and the particular size, weight and configuration of the housing 12 may be changed without departing from the scope of the present technology. The housing 12 may be sized and configured for mounting or retention in the system bag 28 to allow the housing 12, and its various components such as the display system 10, to be included within and transported by the portable system bag 28.

The display 14 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 14 may possess a square or a rectangular aspect ratio and may be viewed in either a landscape or a portrait mode. In various embodiments, the display 14 may also include a touch screen occupying the entire screen or a portion thereof so that the display 14 functions as part of the user interface 16. The touch screen may allow the user to interact with the marine sonar display system 10 by physically touching, swiping, or gesturing on areas of the screen.

The user interface 16 generally allows the user to utilize inputs and outputs to interact with the marine sonar display system 10. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, or the like, or combinations thereof. With the user interface 16, the user may be able to control the features and operation of the display 14. For example, the user may be able to zoom in and out on the display 14 using either virtual onscreen buttons or actual pushbuttons. In addition, the user may be able to pan the image on the display 14 either by touching and swiping the screen of the display 14 or by using multidirectional buttons or dials.

The communication element 18 generally allows communication with external systems or devices. The communication element 18 may include signal or data transmitting and receiving circuits, such as antennas, amplifiers, filters, mixers, oscillators, digital signal processors (DSPs), and the like. The communication element 18 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables or optical fiber cables. The communication element 18 may be in communication with the processing element 26 and the memory element 24.

The location determining element 20 generally determines a current geolocation of the marine sonar display system 10 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 20 may accompany or include an antenna to assist in receiving the satellite signals. The antenna may be a patch antenna, a linear antenna, or any other type of antenna that can be used with location or navigation devices. The location determining element 20 may include satellite navigation receivers, processors, controllers, other computing devices, or combinations thereof, and memory. The location determining element 20 may process a signal, referred to herein as a "location signal", from one or more satellites that includes data from which geographic information such as the current geolocation is derived. The current geolocation may include coordinates, such as the latitude and longitude, of the current location of the marine sonar display system 10. The location determining element 20 may communicate the current geolocation to the processing element 26, the memory element 24, or both.

Although embodiments of the location determining element 20 may include a satellite navigation receiver, it will be appreciated that other location-determining technology may be used. For example, cellular towers or any customized transmitting radio frequency towers can be used instead of satellites may be used to determine the location of the marine sonar display system 10 by receiving data from at least three transmitting locations and then performing basic triangulation calculations to determine the relative position of the device with respect to the transmitting locations. With such a configuration, any standard geometric triangulation algorithm can be used to determine the location of the marine sonar display system 10. The location determining element 20 may also include or be coupled with a pedometer, accelerometer, compass, or other dead-reckoning components which allow it to determine the location of the system 10. The location determining element 20 may determine the current geographic location through a communications network, such as by using Assisted GPS (A-GPS), or from another electronic device. The location determining element 20 may even receive location data directly from a user.

The memory element 24 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory element 24 may include, or may constitute, a "computer-readable medium". The memory element 24 may store the instructions, code, code segments, software, firmware, programs, applications, apps, services, daemons, or the like that are executed by the processing element 26. The memory element 24 may also store settings, data, documents, sound files, photographs, movies, images, databases, and the like.

The processing element 26 may include processors, microprocessors, microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like, or may step through states of a finite-state machine, or combinations of these actions. The processing element 26 may be in communication with the other electronic components through serial or parallel links that include address busses, data busses, control lines, and the like The processing element 26 may be configured to control the operation of the transducer system 22. The processing element 26 may control the operation of the transducer system, such as by setting the phase and/or frequency by the transducer system 22. The processing element 26 may control other parts of the transducer system 22 as well, including the voltage, current, and other electrical characteristics used by the transducer system 22 to generate sonar signals. The processing element 26 may be configured to generate sonar imagery based on the sonar data. The sonar imagery may be communicated to the display 14 and may generally include representations of the underwater objects and/or the water bed derived from the sonar data that are in the path of the sonar signals.

The processing element 26 may receive geolocation or positional information from the location determining element 20. In various embodiments, the processing element 26 may associate the sonar data with geolocation information. The processing element 26 may create a database or a database-like structure, that is stored in the memory element 24, in which a portion of the geolocations in the vicinity of the marine vessel are associated with a depth and a density.

Referring now to FIGS. 2-8, the transducer system 22 may include one or more removable sonar lenses 30, such as the illustrated first lens 30*a*, a transducer unit 32, and a cable 34 extending from the transducer unit 32 for attachment to the display 14 or other components of system 10. The cable 34 is also configured to physically suspend the transducer system 22 in the water during ice fishing applications or other situations where the transducer is not fixedly mounted to a pole or marine vessel. The transducer unit 32 is comprised of a main transducer housing 36, a sonar transducer 38 positioned within or otherwise disposed on the main transducer housing 36, and an attachment mechanism 40 to enables the various sonar lenses 30 to removably attach to the main transducer housing 36 adjacent the sonar transducer 38.

The attachment mechanism 40 may include any elements that allow one of the sonar lenses 30 to securely attach to the main transducer housing 36 adjacent the sonar transducer 38. For instance, the attachment mechanism 40 and lenses may include reciprocal mating elements, such as snaps, levers, bolts, screws, and the like. In some configurations, the attachment mechanism 40 allows lenses 30 to be swapped without requiring the user to employ any tools, which can be difficult to use while ice fishing. In the illustrated examples, attachment mechanism 40 includes grooves 42 on the main transducer housing 36 and reciprocal notches 44 on the lenses 30 that fit within the grooves 42. Lenses 30 may also include protrusions 46 to allow the user to easily bend or otherwise position the lenses 30 to insert and remove the notches 44 into and out of the grooves 42.

Additionally or alternatively, the attachment mechanism 40 may incorporate a magnetic coupling system to facilitate the securement and removal of the sonar lenses 30 from the main transducer housing 36. In this embodiment, one or more magnets are embedded within the periphery of each lens 30, corresponding with metallic or magnetic components integrated into the housing 36. This magnetic interaction allows for a tool-free and tactile-friendly approach, particularly useful in environments where manual dexterity is impaired by gloves or cold temperatures. The magnetic strength is selected to ensure that the lenses 30 remain securely attached during operational movements but can still be removed with a deliberate pull force exerted by the user. The lenses 30 and/or housing 36 may include alignment marks to aid in the correct positioning of the lenses 30 relative to the housing 36, ensuring optimal sonar performance.

As described below, the sonar lenses 30 are configured to modify the beamwidth of sonar signals generated by the sonar transducer 38 to allow the user to select a desired beamwidth for his or her particular fishing scenario. For example, the user might desire a wide beamwidth in some situations to cover more water while fishing (to identify more fish and see more water), while in other scenarios the user may desire a more narrow beamwidth to include more detail (to identify a particular fish species for example). Furthermore, the sonar lenses 30 can be designed to have varying levels of acoustic impedance to tailor the penetration depth and clarity of the sonar signals for specific fishing conditions. A lens with higher acoustic impedance could be employed in deeper waters where stronger sonar penetration is necessary to reach the bottom or detect fish located at greater depths. Conversely, lenses with lower acoustic impedance might be preferred in shallower or murkier waters to enhance the resolution and minimize the noise in the returned sonar signals.

Figure 11:
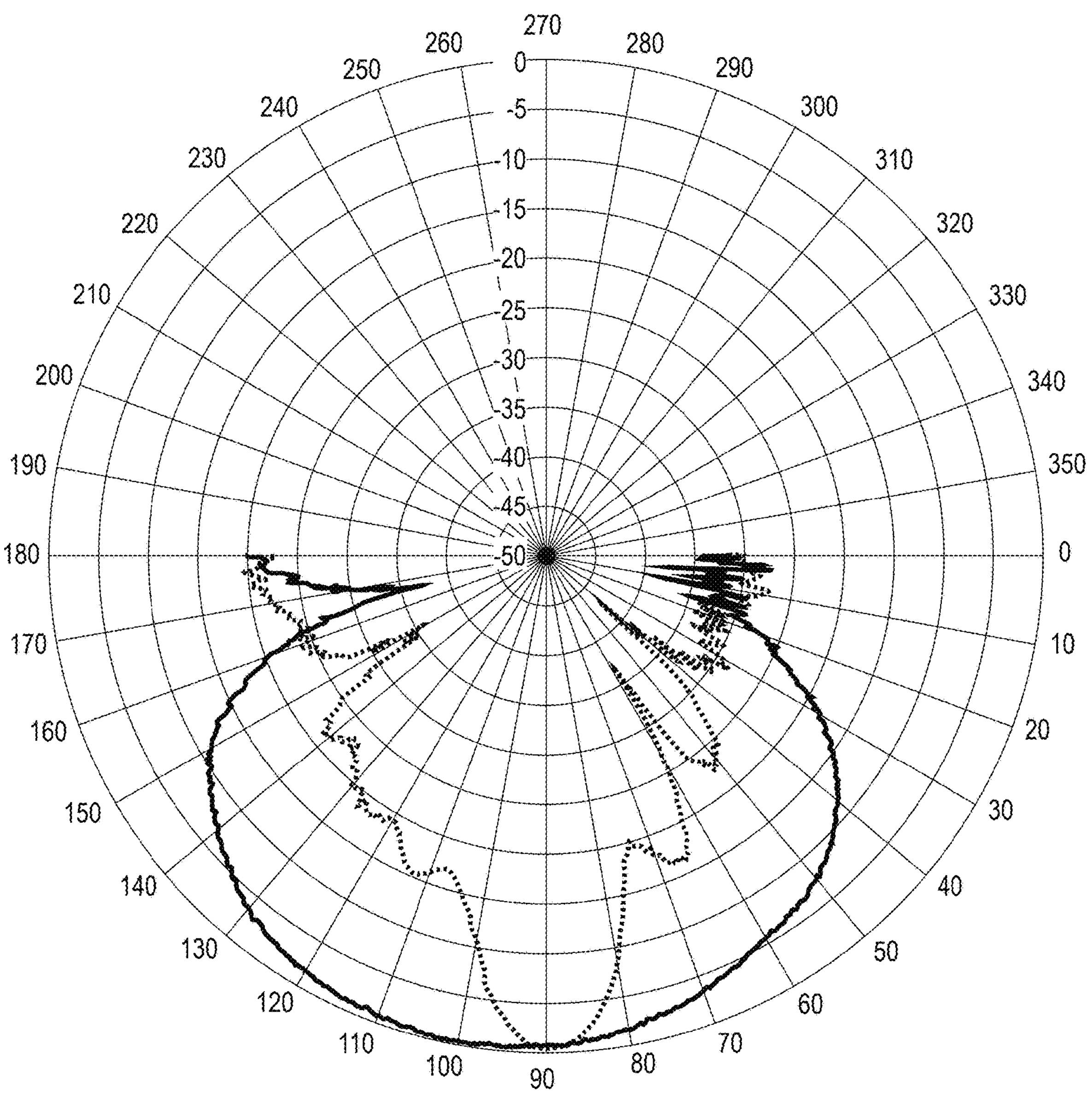
FIG. 11 is a beam plot showing example beam patterns generated by embodiments of the present invention.

Any combination of sonar lenses 30 may be provided by the system 10 to allow users to selected a desired lens for any situation-including narrow and wide beamwidths of varying degree, main lobe and side lobe directions and amplitudes, and the like. In one example, first lens 30*a* is configured to modify the sonar signals generated by the sonar transducer 38 from as first beamwidth to a second beamwidth, while a second lens is configured to modify the sonar signals generated by the sonar transducer 38 from as first beamwidth to a third beamwidth, where the third beamwidth is wider than the second beamwidth. Example beamwidths for first lens 30*a* and sonar transducer 38 are illustrated in FIG. 11, where first lens 30*a* produces a beamwidth of approximately 12 degrees while the sonar transducer 38 without the first lens 30*a* produces a beamwidth of approximately 57 degrees. An example second lens can produce a beamwidth of approximately 25 degrees. Thus, the transducer system 22 may be utilized with the lenses 30 in its default configuration or with one or more of the lenses 30 to produce a different beampattern and user experience.

Additionally, the lenses 30 can include materials that alter the phase characteristics of the sonar signals in conjunction with beamwidth adjustments. For instance, a third lens could be designed to phase-shift the sonar waves such that the main lobe is steered to a specific angle relative to the standard alignment of the transducer housing 36. This capability allows for the directional focusing of sonar beams towards areas of interest without physically repositioning the entire transducer unit. Such lenses would employ materials or constructions that intentionally delay or advance the wavefront passing through, effectively steering the beam laterally.

In one example, the sonar transducer 38 may generally include multibeam, phased-array sound navigation and ranging (sonar) components, including a phased-array transducer such as a Garmin® Panoptix® PS-22 transducer or the like. Example phase-array configurations that may be provided by sonar transducer 38 are described within U.S. Pat. No. 9,812,118, which is incorporated herein by specific reference in its entirety. Sonar transducer 38 may additionally or alternatively include frequency-steered sonar components, such as a Garmin® Livescope™ LVS34 or LVS32 transducer the like. Example frequency-steered configurations that may be provided by sonar transducer 38 are described within U.S. Pat. Nos. 10,890,660 and 11,536,820, each of which is incorporated by specific reference in their entirety. Of course, sonar transducer 38 may include any type of sonar transducer element, including scanning sonar elements such as downscan and sidescan sonar and conical-beam sonar elements configured to generate conventional sonar returns. The sonar lenses 30 enable the user to easily adapt the beampattern generated by any type of sonar transducer for a particular fishing situation.

The sonar lenses 30 may include any configuration to modify the sonar signals generated by sonar transducer 38. That is, sonar lenses 30 may be formed of acoustic and/or potting materials, such as epoxy resins, polyurethane, ceramics, rubbers, and the like, to achieve desired modifications to sonar signals. In the illustrated examples, sonar lens 30*a* includes a first arcuate portion 48 and a second arcuate portion 50 to provide the desired second beamwidth. By altering the curvature, radius, and/or other characteristics of the sonar lenses 30, any desired beamwidth may be produced by the various lenses. The curvature of the sonar lenses 30 influences the beamwidth by modifying the propagation characteristics of the sonar waves emitted from the sonar transducer 38. A lens characterized by a more pronounced curvature imparts a convergent effect on the sonar waves, thereby reducing the angular spread and producing a narrower beamwidth. Conversely, a lens with reduced curvature exerts a divergent effect on the sonar waves, thereby increasing their angular spread and resulting in a broader beamwidth.

Additionally or alternatively, the sonar lenses 30 can be designed to incorporate different surface textures or microstructures to manipulate the sonar signals in specific ways. For example, a lens surface may be engineered with fine grooves, ridges, or dimples that create a diffraction or diffusion effect on the sonar waves passing through. These microstructures can be precisely calibrated to scatter the sonar waves, thereby enhancing the resolution or focusing capability of the sonar system. The incorporation of such textural modifications allows for the customization of the sonar signal properties based on specific operational requirements or environmental conditions.

In some configurations, transducer unit 32 may include one or more cable extension arms 52 that extend from the main transducer housing 36 to retain the cable 34 and position the main transducer housing 36 within the water at one of a plurality of angles. The arms 52 may attach to the housing 36 in one of a plurality of positions, such as through ratcheting, bolting, rotational elements, and the like, to allow the user to set the desired angle of the main transducer housing 36 based on the angle between the arms 52 and housing 36. For example, the user might desire the transducer 38 to point straight down in the water. Or, the user might desire the transducer 38 to point at a 15, 45, or even 90 degree angle to the surface while suspended in the water. Such functionality allows users to quickly change viewing modes between down and forward based on the fishing environment.

Another approach for attaching the arms 52 to the housing 36 involves the use of a ball-and-socket joint, which provides enhanced flexibility in positioning the transducer housing 36 at various angles. This type of joint allows for omnidirectional movement, enabling the user to effortlessly adjust the angle of the transducer housing 36 in multiple planes. The socket portion can be integrated into the housing 36, with the ball part attached to the end of the arms 52. Friction or a locking mechanism within the socket can be adjusted to require varying amounts of force to move or lock the ball in place, thereby maintaining the housing 36 in a set position until the user decides to re-adjust.

Figure 9:
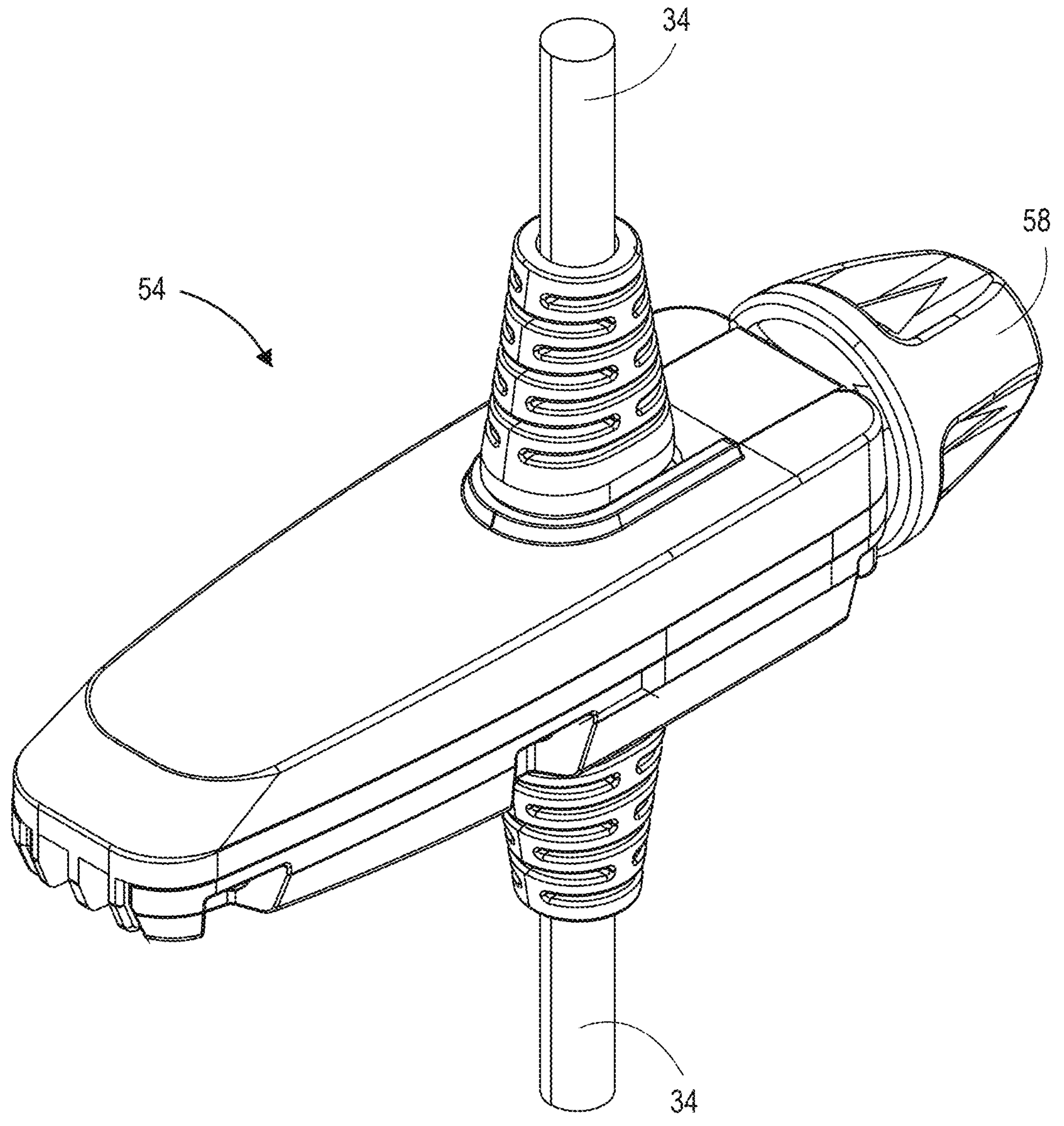
FIG. 9 is a perspective view of a rotator assembly forming part of the sonar display system.
Figure 10:
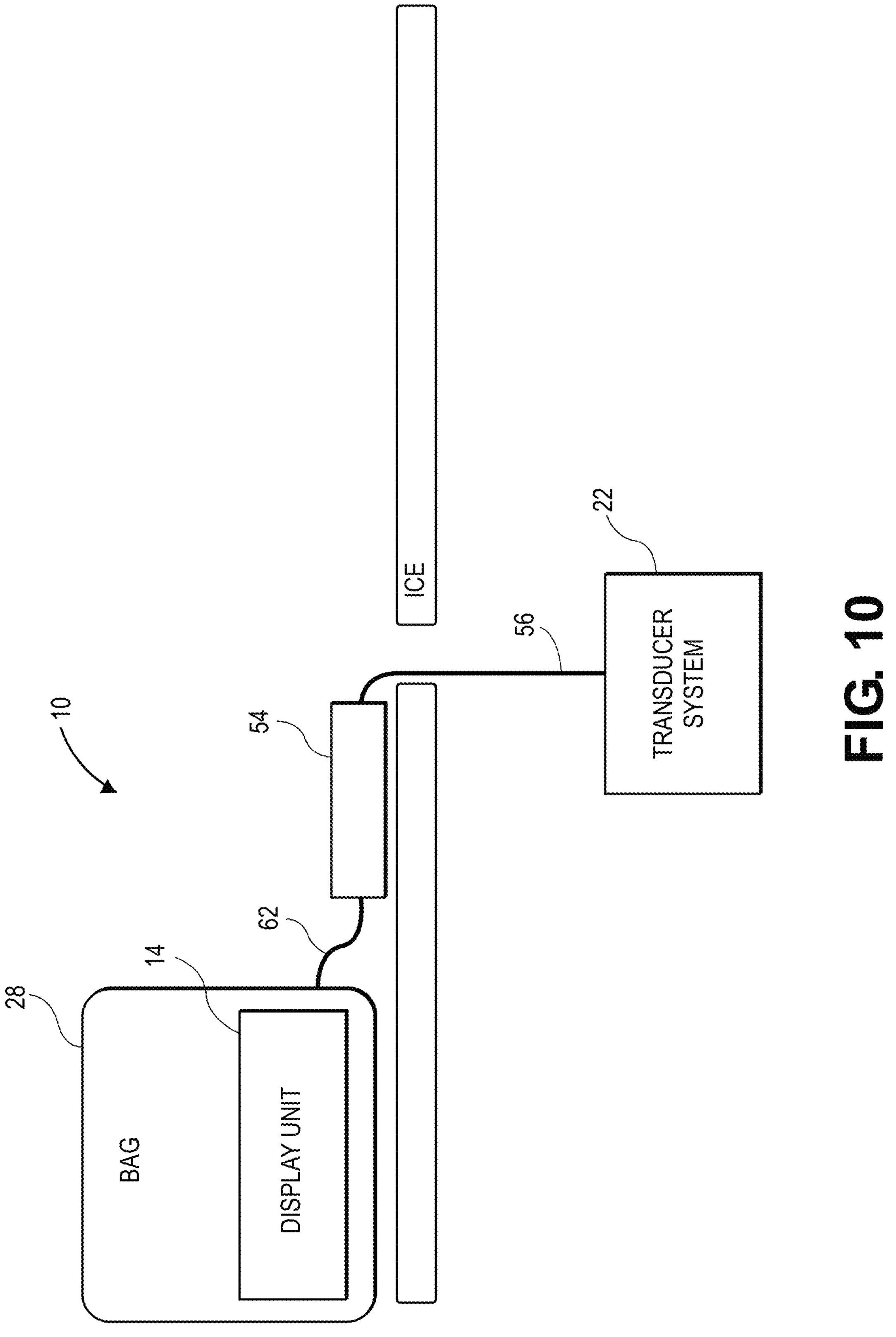
FIG. 10 is a block diagram showing the position of the various components of the display system in relation to the ice surface.

As shown in FIGS. 9-10, transducer unit 32 may additionally include a rotator assembly 54 to removably attach to the cable 34 to set a first cable length 56 between the rotator assembly 54 and main transducer housing 36. Such functionality enables the user to help set the depth of the main transducer housing 36 in the water. In one example, rotatory assembly 54 includes knob 58 that may be rotated by the user (by hand, without tooling) to pinch or otherwise retain the cable 34 within the rotator assembly 54 to set the first cable length 56. While fishing, the rotator assembly 54 may be left above water, and on the surface of the ice, to allow the user to easily readjust the first cable length 56 and to remove the transducer unit 32 from the water.

The portable system bag 28 may be used to easily move the system 10 to a desired spot on the ice or other fishing location. The portable system bag 28 may include a battery 60, brackets, mounting hardware, handles, and the like for assisting in use of the system 10 and powering its various components. The portable system bag 28 may include a cable retention element, such as hook-and-loop fasteners, straps, ties, and the like, to set a second cable length 62 between the portable bag 28 and rotator assembly 54. The combination of the first cable length and second cable length allows the user to easily set the depth of the main transducer housing 36 in the water without requiring the use of a transducer pole or other cumbersome equipment. The weight of bag 28 anchors the cable 34, the rotator assembly 54, and the suspended transducer unit 32 without requiring additional components.

In operation, the user may carry system bag 28 to a desired fishing spot, such as near a fishing hole formed in a sheet of ice. The user may remove the transducer unit 32 from the bag 28 and set the second cable length 62 using the cable retention element. Next the user can set the first cable length 56 by fixing the rotator assembly 54 at a desired spot along cable 34 by rotating the knob 58 of rotatory assembly. The user may then set the desired angle of the main transducer housing 36 by rotation cable extension arms 52 to a desired angle. The user then can select a desired one of the sonar lenses 30, such as a lens having a particular beamwidth, to attach to main transducer housing 36 using attachment mechanism 40. The user can then suspend the transducer unit 32 in the water, which will drop the set depth and be positioned at the set angle, to happily fish.

The invention claimed is:

1. A transducer system comprising:

a first removable sonar lens;

a transducer unit including:

a main transducer housing, a sonar transducer positioned within the main transducer housing, the sonar transducer configured to generate sonar signals having a first beamwidth, and an attachment mechanism to enable the sonar lens to removably attach to the main transducer housing adjacent to the sonar transducer, the first sonar lens configured to modify the generated sonar signals from the first beamwidth to a second beamwidth;

a cable extending from the transducer unit and configured to couple the transducer unit to an electronic display unit, the cable configured to both physically suspend the transducer housing in water and to electronically convey sonar data to the electronic display unit;

a rotator assembly configured to removably attach to the cable to set a first cable length between the rotator assembly and the main transducer housing; and a portable bag, the portable bag including the electronic display unit and a battery for powering the display unit and the transducer system, the portable bag further including a cable retention element to set a second cable length between the portable bag and the rotator assembly.

2. The system of claim 1, further including a second removable sonar lens, wherein the second removable sonar lens is configured to attach to the main transducer housing adjacent to the sonar transducer and modify the generated sonar signals from the first beamwidth to a third beamwidth.

3. The system of claim 1, further including a plurality of sonar lenses, wherein each of the sonar lenses is configured to removably attach to the main transducer housing to provide a unique beamwidth for sonar signals generated by the sonar transducer.

4. The system of claim 1, wherein the transducer includes a phased-array transducer.

5. The system of claim 1, wherein the transducer includes a frequency-steered transducer.

6. The system of claim 1, wherein the transducer unit includes cable extension arms, the extension arms extending from the main transducer housing and configured to retain the cable and position the main transducer housing within the water at one of a plurality of angles.

7. A transducer system comprising:

a first removable sonar lens;

a transducer unit including:

a main transducer housing, a sonar transducer positioned within the main transducer housing, the sonar transducer selected from the group consisting of a phased-array transducer and a frequency-steered transducer, the sonar transducer configured to generate sonar signals having a first beamwidth, and an attachment mechanism to enable the first removable sonar lens to removably attach to the main transducer housing adjacent to the sonar transducer, the first sonar lens configured to modify the generated sonar signals from the first beamwidth to a second beamwidth, the second beamwidth being narrower than the first beamwidth, the a cable extending from the transducer unit and configured to couple the transducer unit to an electronic display unit, the cable configured to both physically suspend the transducer housing in water and to electronically convey sonar data to the electronic display unit;

a rotator assembly configured to removably attach to the cable to set a first cable length between the rotator assembly and the main transducer housing;

wherein the transducer unit further includes a cable extension arm, the extension arm extending from the main transducer housing and configured to retain the cable and position the main transducer housing within the water at one of a plurality of angles; and a portable bag, the portable bag including the electronic display unit and a battery for powering the display unit and the transducer system, the portable bag further including a cable retention element to set a second cable length between the portable bag and the rotator assembly.

* * * * *